United States Patent [19]

Breuer et al.

[11] Patent Number: 5,014,150
[45] Date of Patent: May 7, 1991

[54] MAGNETIC TAPE CASSETTE HAVING OUTER APPEARANCE MODIFIED BY SURFACE PRINTING

[75] Inventors: Rudolf Breuer, Munich; Gottfried Lutz, Seefeld; Albert Pertzsch, Munich; Helmut Schultz, Gauting, all of Fed. Rep. of Germany

[73] Assignee: Reel/Frame: 5061/0928 Agfa-Gevaert Aktiengesellschaft, Leverkusen, Fed. Rep. of Germany

[21] Appl. No.: 335,041

[22] Filed: Apr. 7, 1989

[30] Foreign Application Priority Data

Apr. 21, 1988 [DE] Fed. Rep. of Germany ....... 3813359

[51] Int. Cl.$^5$ .......................................... G11B 23/087
[52] U.S. Cl. .................................................... 360/132
[58] Field of Search ......................... 360/132; 242/199

[56] References Cited

U.S. PATENT DOCUMENTS

| 4,267,986 | 5/1981 | Uemura et al. | 242/199 |
| 4,280,136 | 7/1981 | Kashima et al. | 360/132 |
| 4,530,475 | 7/1985 | Buerkle et al. | 360/132 |
| 4,825,320 | 4/1989 | Oishi et al. | 360/132 |
| 4,919,873 | 4/1990 | Oishi et al. | 360/132 |

FOREIGN PATENT DOCUMENTS

| 0137929 | 1/1982 | European Pat. Off. |
| 7628256 | 9/1976 | Fed. Rep. of Germany |
| 3111304 | 3/1981 | Fed. Rep. of Germany |
| 3614898 | 11/1987 | Fed. Rep. of Germany |

Primary Examiner—Robert S. Tupper
Attorney, Agent, or Firm—Connolly and Hutz

[57] ABSTRACT

A magnetic tape cassette, for example an audio cassette, which is distinguished by an attractive outer appearance, consists of a bottom part and a top part, transparent in each case, and contains inside it two adjacent tape rolls. The bottom part and the top part each have a transparent housing wall having transparent or slightly colored regions and opaque or untransparent regions. The untransparent or opaque regions are produced by printing surface areas of the cassette housing walls including the application of various patterns and/or colors.

5 Claims, 1 Drawing Sheet

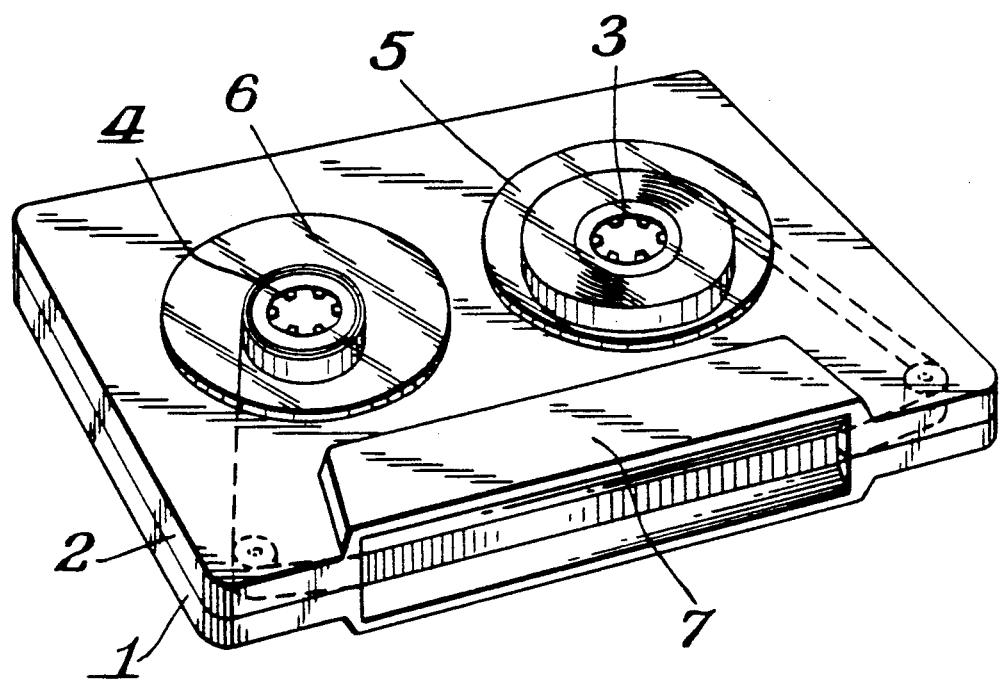

MAGNETIC TAPE CASSETTE HAVING OUTER APPEARANCE MODIFIED BY SURFACE PRINTING

INTRODUCTION

The invention relates to a magnetic tape cassette having two adjacent rolls, which are rotatably mounted in a housing between two opposite transparent housing walls, the housing walls comprising transparent and opaque regions and the magnetic tape cassette being distinguished by an appealing outer appearance.

BACKGROUND OF THE INVENTION

1. Field of the Invention

In the case of the known audio and video cassettes, the usually two-part right-parallelepiped cassette housing consists of opaque, usually black-coloured plastic material, there usually being rectangular transparent regions for observing the tape rolls on one or, preferably, both outsides of the cassettes. In these cases, the transparent regions are adhesively fixed or welded into the remaining opaque housing, as a result of which cassettes of a relatively low dimensional stability are obtained. In order to eliminate this disadvantage, transparent and opaque parts are injection-moulded simultaneously and thus joined together and form one unit, which constitutes a costly process however. Furthermore, labels and other panels providing the good appearance of the cassette are adhesively affixed.

2. Description of Related Art

Also known are audio cassettes with which the housing walls are one piece and are completely transparent, such as for example in U.S. Pat. No. 4,267,986 and DE-OS 3,019,441, 3,111,304, 3,614,898. It is known from EP 0,137,929 to colour the housing walls and thus lend the cassette an attractive appearance. It is known from DE-GM 7,628,256 to make parts of the transparent cassette walls opaque by masking. In addition, methods of colour-coating of the cassette walls exist. Finally, DE 3,604,261 describes designing housing parts in two layers, namely consisting of, for example, a transparent layer and an opaque layer, which are laminated on each other.

It is shown from the prior art presented above that, to produce a magnetic tape cassette with an attractive outer appearance, either several successive operations are required or a complicated structure, or else that mechanical deficiencies of the cassette have to be accepted. It is therefore the object to create a magnetic tape cassette of the type mentioned at the beginning which does not have the deficiencies listed and which can be produced simply and inexpensively.

SUMMARY OF THE INVENTION

The object is achieved according to the invention with a cassette having two opposite housing walls, two adjacent hubs on which magnetic tape is wound rotatably mounted within the housing walls and the housing walls having transparent or slightly colored regions and opaque or untransparent regions. According to the invention the opaque or untransparent regions are produced by printing surface areas of the cassette housing walls. Further details of the invention emerge from the subclaims, the description and the drawing.

BRIEF DESCRIPTION OF THE DRAWING

The invention is described in more detail below with reference to the drawing, in which the figure shows an essentially two-part audio cassette.

DESCRIPTION OF THE PREFERRED EMBODIMENTS

The invention is now described with reference to a number of examples on the basis of the figure.

EXAMPLE 1

A compact cassette, as shown in the figure is essentially made in two parts and consists in each case of a transparent bottom part (1) and top part (2) and the tape rolls (5, 6), which are in the inner compartment on the hubs (3, 4). The head chamber (7) is integrated in the bottom and top parts. The finished assembled cassette is then printed on both sides by means of two opposite offset printing units, the head chamber and the other areas, with the exception of the required transparent regions (for example roll regions) (5, 6), being printed opaquely, for example black.

EXAMPLE 2

A compact cassette according to the figure is passed through a transport section in a mass production line and is printed over its surface area on both sides by means of a plurality of successively arranged, in each case oppositely paired tampon printing units in several successive steps with different patterns and/or colours, including label. In so doing, different regions, or the projecting head chamber, may be printed separately from the other regions. Production rates up to 150 cycles per minute are possible thereby.

EXAMPLE 3

Example 2 is repeated, only the bottom part and top part were slightly coloured.

Compact cassettes which are produced and printed according to the three examples receive a good attractive appearance. Of course, the method may also be extended to other cassettes types, for example to video cassettes or R-DAT cassettes. Furthermore, as usual, in addition, labels may be adhesively affixed and inscriptions printed on.

We claim:

1. Magnetic tape cassette, consisting of two adjacent hubs, onto which magnetic tape is wound, which are mounted rotatably in a housing between two opposite transparent housing walls and the housing walls including transparent or slightly coloured and untransparent regions, characterized in that the untransparent regions are produced by printing over the surface area of the cassette walls.

2. Magnetic tape cassette according to claim 1, characterized in that the untransparent regions are produced by tampon printing or offset printing.

3. Magnetic tape cassette according to claim 2, characterized in that one or both cassette sides at the same time are treated by multiple printing of different patterns and/or colours and designations.

4. A magnetic tape cassette as claimed in claims 1 or 3 having labels adhesively affixed onto the housing walls.

5. A magnetic tape cassette as claimed in claims 1 or 3 having inscriptions printed on the housing walls.

* * * * *